Figure 1:
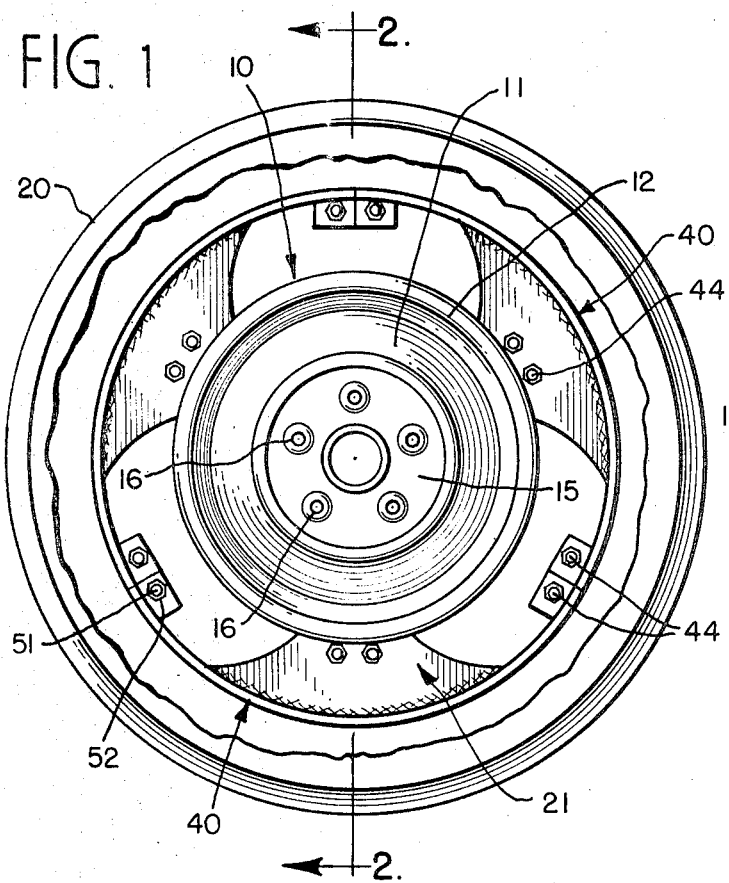

United States Patent

[11] 3,550,664

| [72] | Inventor | Donald D. Lee<br>8950 S. 84th Ave., Hickory Hills, Ill. 60457 |
|---|---|---|
| [21] | Appl. No. | 697,673 |
| [22] | Filed | Jan. 15, 1968 |
| [45] | Patented | Dec. 29, 1970 |

[54] MOTOR VEHICLE SAFETY WHEEL
2 Claims, 3 Drawing Figs.

[52] U.S. Cl. .................................................. 152/158
[51] Int. Cl. ...................................................... B60b 25/00;
B60c 17/04
[50] Field of Search .......................................... 152/158,
157, 340

[56] References Cited
UNITED STATES PATENTS

| 2,775,282 | 12/1956 | Kennedy | 152/158 |
| 2,986,189 | 5/1961 | Lindley | 152/158 |
| 3,394,749 | 7/1968 | Lindley | 152/158 |
| 3,435,872 | 4/1969 | Johnson | 152/158 |

*Primary Examiner*—Arthur L. LaPoint
*Assistant Examiner*—George H. Libman
*Attorney*—Frederick J. Krubel

ABSTRACT: A pneumatic tire and wheel assembly for motor vehicles including a safety auxiliary rim adapted to be assembled on a conventional vehicle wheel and disposed within the tire and be normally radially spaced from the tread and wheel rim when the tire is inflated and is adapted to operatively engage the inner surface of the tire tread upon deflation of the tire.

PATENTED DEC 29 1970

3,550,664

Inventor
Donald D. Lee

By 
Attorney

MOTOR VEHICLE SAFETY WHEEL

This invention relates to motor vehicle wheels and more particularly to a new and improved motor vehicle safety wheel for use in conjunction with a conventional pneumatic tire of the tubeless type.

As pointed out in Letters Patent of the United States No. 2,775,282 granted to Kennedy under date of Dec. 25, 1956, the cause of many serious accidents on the highways and byways has been the sudden and unpredictable deflation of one or more of the vehicle pneumatic tires due to punctures or blowouts when traveling at a high rate of speed. It is common knowledge that vehicle operator has a difficult time attempting to maintain control of the vehicle upon the sudden collapse of a tire because of the relative difference in the rolling radii between a properly inflated tire and wheel assembly and a wheel having a deflated tire mounted thereon since there is a definite tendency of the vehicle to pivot on the collapsed tire before the vehicle can be safely brought to a stop. A great deal of thought and effort has been given to the problem of safeguarding the vehicle, cargo, and its passengers during such an eventuality both before and since the issuance of U.S. Pat. No. 2,775,282 but much remains to be desired insofar as the results and costs of providing efficient safety devices are concerned. The primary objective of the present invention like that of the above-identified patent is the provision of a vehicle wheel and pneumatic tubeless tire assembly in which the rolling radius of the tire is not materially altered upon the sudden loss of air pressure from within the tire to thus mitigate, if not eliminate, the dangers noted above upon the sudden deflation of the tire. The safety tire and wheel assembly to which the present invention pertains will adequately support the vehicle and prevent the vehicle from swerving from its intended path in the event that a tire should suddenly and without prior warning blow out.

The present invention is an improvement of that shown and described in the above identified Letters Patent and one of the objects of the invention is to simplify the vehicle safety wheel structure and design of said patent and thereby reduce manufacturing and assembly costs.

While the present invention is primarily concerned with the safeguarding of life and limb as was the primary object of the aforementioned patent it is also effective to prevent the destruction of or injury to the deflated tire which generally occurs during the elapsed time between the moment of blowout until the vehicle can be brought to rest. Heretofore, when the tire was completely deflated or had an internal pressure less than the normal pressure corresponding to the properly inflated pressure of the tire, the section of the sidewalls of the tires adjacent to the ground were caused to flex abnormally to thus subject the sidewalls to the cutting action of the relatively sharp edges of the rim as well as to weaken the bond that holds the various plies of the tire together which ultimately resulted in the irreparable breakage of the ply material. Abnormal flexing of the sidewalls also can occur when the tire is partially deflated because of a leak and the fact that the tire is partially deflated is not apparent to the vehicle operator. It is therefore another object of the present invention to provide a tire and wheel assembly wherein the tire is protected against damage resulting from total or partial deflation which protection never ceases to exist and enables the vehicle to be operated for an indefinite period of time even though one or more of the tires is under inflated Still another object of the present invention is the provision of a novel safety auxiliary rim particularly suitable for use with a pneumatic tubeless tire which auxiliary rim is readily assembled on the rim of a conventional motor vehicle wheel and which ground engaging tire and wheel assembly, when substituted for all of the conventional tire and wheel assemblies in a motor vehicle, eliminates the need for stopping the motor vehicle immediately in the event one or more of the tires becomes deflated for the purpose of changing the deflated tire. Furthermore, the use of the tire and wheel assemblies of the present invention precludes the necessity of carrying a spare tire and wheel assembly which are costly and require storage space since, as is well known, conventional tubeless tires are required to be mounted on the vehicle wheel.

Another object is the provision of a simple and efficient safety wheel for supporting a proportional part of the weight of a vehicle equipped therewith in the event the pneumatic tire mounted thereon becomes deflated from punctures, blowouts, or for any other reason without the tire completely collapsing and includes an annular auxiliary rim which is uniquely attached to the wheel rim upon which the pneumatic tire is mounted and projects radially inwardly of the tire. The auxiliary rim is mounted on the wheel rim in such a manner so as to afford a radial clearance between the auxiliary rim and the inner surface of the tire tread when the tire is properly inflated. However, when the tire becomes deflated, the safety auxiliary rim limits the amount of flexing permitted by the deflated tire casing.

A further object is to provide a vehicle wheel of the drop-center rim type having a safety device incorporated therein which safety device is disposed within the pneumatic tire mounted on the wheel and thus is invisible and does not modify the appearance of the wheel or the vehicle. Furthermore, the safety device will not interfere with the normal operation of the vehicle and is made of strong and durable parts which are relatively inexpensive to manufacture and simple to assemble and are relatively damage-free and wearproof.

A still further object is the provision of a sectional auxiliary safety rim and simple and efficient means for joining the sections together and attaching the same to the vehicle wheel to form an effective emergency rolling support should the tire associated therewith become deflated.

Still another object is the provision of a safety auxiliary rim which when used in conjunction with a pneumatic tubeless tire and wheel assembly prevents abnormal wear of the tire tread resulting from the vehicle rounding curves at high speed and the vehicle weight being shifted to the outer tires sufficiently to cause considerable flexing and squealing of the tires disposed on the outside of the curve; the auxiliary rim limits the amount of flexing and provides a relatively solid support between the ground and the wheel hubs.

Still another object is the provision of a safety rim construction which may be readily assembled on a conventional drop-center rim type vehicle wheel with conventional hand tools and requires very little more time to accomplish the operation than required to mount a pneumatic tubeless tire on a conventional vehicle wheel.

Figure 2:
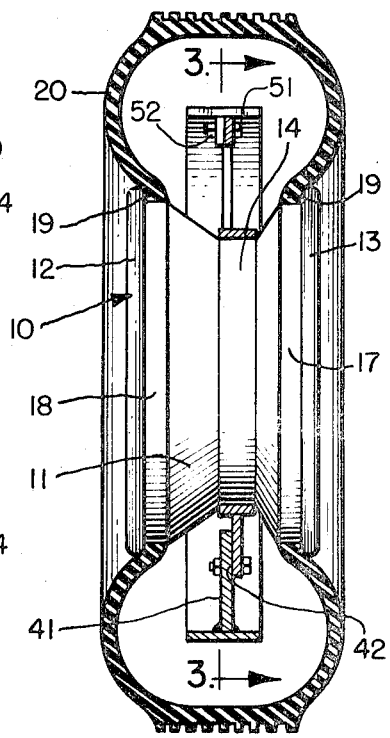
Figure 3:
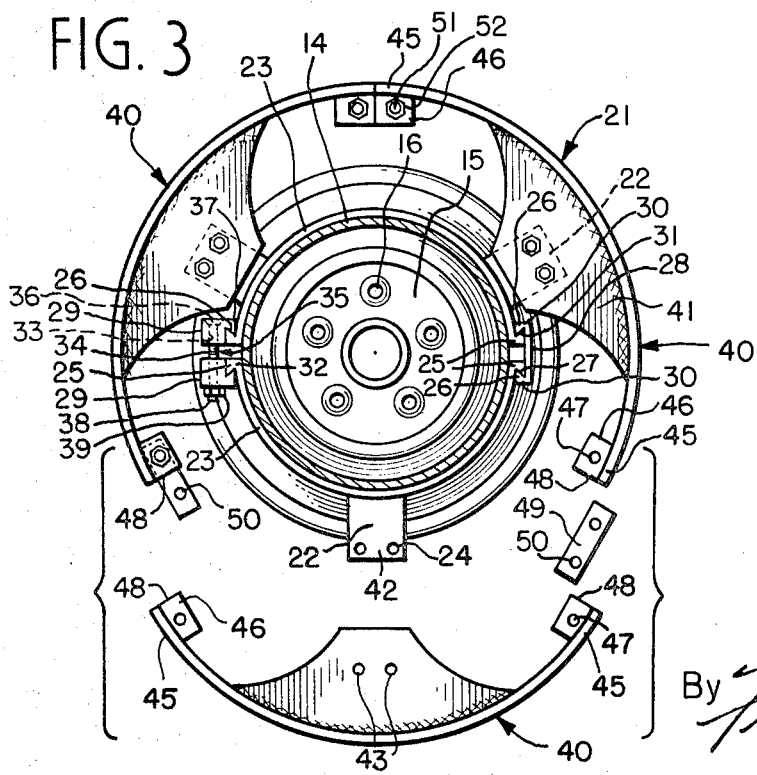
Figure 3:

The foregoing and other important objects and desirable features inherent in and encompassed by the invention, together with the many purposes and uses thereof, will become readily apparent from a reading of the ensuing description in conjunction with the annexed drawings, in which, FIG. 1 is a side elevational view of a vehicle tire and wheel assembly embodying the invention; certain parts are broken away to better illustrate the construction and arrangement of the several elements;

FIG. 2 is a vertical sectional view taken substantially along line 2—2 of FIG. 1; and FIG. 3 is an exploded view of the safety auxiliary rim partly assembled, a portion of the vehicle wheel is shown in vertical section to better illustrate the invention.

Referring to the drawings in detail, wherein like reference characters represent like elements throughout the various views, a wheel body designated generally by numeral 10 is shown. The wheel body 10 is circumscribed by an annular rim 11. The rim 11 may be formed in any suitable well known manner as, for example, by rolling a flat sheet in a desired contour and welding the abutting ends to complete the annulus. The cross-sectional contour of the rim 11 illustrated is simply one well-known form which is in use today and is commonly referred to as a "drop-center" type of rim. The contour of the rim 11 is best shown in FIG. 2 and it will be noted that the normally inner and outer (when the wheel is mounted on the vehicle) side flanges or walls 12 and 13, respectively, thereof are radially spaced outwardly of the annular depressed center portion 14. The center of the wheel body 10 is in the form of a generally circular dish-shaped disc 15 which is rigidly secured to the rim 11 and is provided with a center opening for receiving a hub (not shown). The circular disc 15 is also provided with a plurality of circumferentially spaced apertures 16 surrounding the central opening which are embossed or coined to facilitate bolting of the wheel body 10 to a mounting flange (not shown) of the hub. The details of the formation of the wheel body 10 and the rim 11 and the means for securing the wheel body 10 to the vehicle hub constitute no part of the present invention and it is to be understood that simply one of a variety of well-known available forms and means is shown. All of the forming operations noted above may for example be carried out in a hydraulic press with suitable blanking and forming disc. The side flanges 12 and 13 and the annular axially extending tire bead perches 17 and 18 extending from the side flanges 12 and 13, respectively, are designed for maintaining the beads 19 of a conventional pneumatic, tubeless tire 20 in position on the rim 11 in the usual manner. The tire beads 19 fit closely against the side flanges 12 and 13 and the perches 17 and 16 and are sealed thereto in such a manner that air contained within the tire may not escape around the beads.

The safety auxiliary rim and improved means for mounting the same on the wheel structure described above is designated generally by numeral 21. It is to be understood that the true running qualities of the wheel structure to which the safety device 21 is incorporated is not effected in any way by such incorporation and furthermore the safety device 21 adds very little weight over an ordinary or conventional tire and wheel assembly. The safety auxiliary rim or safety device 21 includes three circumferentially spaced, radially extending platelike brackets 22, two of which have their radially innermost ends rigidly secured as by welding or the like to one of a pair of substantially identical arcuate mounting members 23. The third bracket 22 is similarly secured to the other mounting member 23. The brackets 22 are positioned on the mounting members 23 in such a manner that when the mounting members 23 are assembled on the vehicle wheel 10, as shown in FIG. 1, each bracket 22 will be circumferentially spaced substantially 120° from the adjacent brackets 22. The brackets 22 are each formed with a pair of spaced apertures 24. As best shown in FIG. 2, the width of the arcuate mounting members 23 is substantially the same as the axial width of the depressed center portion 14 of the wheel rim 11 and when assembled on the wheel 10, the mounting members 23 are adapted to abut the depressed center portion 14 as shown in FIGS. 2 and 3, to thus enhance axial stability of the mounting members 23. It will be noted that the apertures 24 provided in the free end or terminal portion of each bracket 22 are disposed radially outwardly of a circle containing the radially outermost edges of the rim side flanges 12 and 13. In other words, a terminal portion of each bracket 22 projects radially outwardly beyond the rim side flanges 12, 13, as shown in FIGS. 1 and 2.

As clearly illustrated in FIG. 3, each of the terminal portions 25 of each mounting member 23 is in the form of a radially extending enlargement partially defined by an inclined or ramp surface 26. Each terminal enlarged portion 25 is also provided with a radially extending flat surface 27. The circumferential length of the mounting members 23 is less than the circumference of the depressed center portion 14 and as a result each radially extending flat surface 27 terminal portion 25 of one mounting member 23 is circumferentially spaced from a respective terminal portion flat surface 27 of the other mounting member 23 when the mounting members 23 are properly assembled on the depressed center portion 14 of the wheel 10.

The means for detachably securing the mounting members 23 on the depressed center portion 14 includes a bridge element 28 and a pair of relatively movable clamp elements 29. The bridge element 28 has end formations 30, each of which is adapted to hook over one of the terminal portions 25 of a respective mounting member 23. The end formations 30 are provided with flat surfaces 31 which are adapted to be substantially in the same planes as and to slidingly engage the inclined surfaces 26 of the terminal portion 25 when the bridge element 28 is assembled on the mounting members 23. The clamp elements 29 are each formed with a notch which is partially defined by a flat surface 32. Each clamp element 29 is also provided with a bore 33 therethrough. As shown in FIG. 3, the notch surfaces 32 of the clamp elements 29 are each adapted to lie substantially in the plane of an inclined surface 26 of a respective mounting member terminal portion 25 when the bores 33 are substantially in alignment. The elongated shank 34 of a bolt 35 is insertable through the aligned bores 33 with the enlarged head 36 thereof abutting a generally radially extending face 37 of one of the clamp elements 29 and the free threaded end section 38 of the bolt 35 projecting outwardly from the radially extending face 37 of the other clamp element 29. From the foregoing, it is believed the manner in which the mounting members 23 are rigidly secured to the depressed center portion 14 is apparent. The mounting members 23 are merely positioned on the depressed center portion 14 and the bridge element 28 is hooked over one of the enlarged end portions 25 of one of the mounting members 23 and the adjacent enlarged end portion 25 of the other mounting member 23. Thereafter, each clamp element 29 is positioned on a respective opposite terminal portion 25 with the notch surface 32 thereof abutting an inclined surface 26 and the bores 33 in alignment. The shank 34 of the bolt 35 is then inserted through the aligned bores 33 with the enlarged head abutting the radial face 37 of one of the clamp elements 29. A nut 39 is adapted to be threaded on the protruding threaded shank section 38 of the bolt 35 and by rotating the same in the proper direction the clamp elements 29 and thus the terminal portions 25 of the mounting members 23 engaged thereby to move circumferentially toward each other. Inasmuch as the opposite ends of the mounting members 23 are restrained from moving circumferentially away from each other beyond a certain point by the bridge element 28 a tremendous radially inwardly directed clamping force can be applied to the mounting members 23 simply by drawing the nut 39 up tightly. From the foregoing, it will be appreciated that by virtue of the novel construction of the mounting members 23 on the depressed center portion 14, the mounting members 23 may be rigidly secured to the wheel 10 so as to be, in effect, an integral part thereof with a minimum of effort and without the need of any special tools or equipment.

The safety auxiliary rim 21 also includes three arcuate segments 40 which, when assembled together as will be pointed out hereinafter, form a circular rim. Each segment 40 is generally rectangular in radial cross section, as shown in FIG. 3. Rigidly fixed to the intermediate section of each segment 40 as by welding or the like is a radially inwardly extending member 41 which is in the form of a flat plate. Each member 41 has a radially innermost central portion adapted to overlap and abut the inwardly facing surface 42 of the terminal portion of a respective bracket 22 and such central portion is provided with a pair of apertures 43 therethrough which are registerable with the apertures 24 of a respective bracket 22. In order to secure the segments 40 in their operative position to the mounting members 23 as shown in FIG. 1, bolt and nut assemblies, designated generally by reference character 44, adapted to extend through each set of aligned apertures 24, 43 are used. As clearly shown in FIG. 3, each of the end portions 45 of each of the segments 40 has a radially inwardly extending tab 46 welded thereto which is formed with an aperture 47 therethrough. It will be noted that radial edge surface 48 of each segment end portion 45 and the tab 46 associated therewith abuts the radial edge surface 48 of the adjacent segment end portion 45 and the tab 46 associated with such adjacent segment end portion when the safety auxiliary rim 21 is assembled on the wheel 10. Connector members 49 in the form of generally rectangular plates are utilized to rigidly interconnect the ends of adjacent segments 40 together. The connector members 49 have each of their end portions provided with an aperture 50. Each connector member 49 is positionable to bridge each pair of abutting radial edge surfaces 48 with one end portion thereof overlapping and abutting a segment tab 46 and the opposite end portion similarly overlapping and abutting the segment tab 46 and the opposite end portion similarly overlapping and abutting the segment tab 46 adjacent thereto. A stud 51 is insertable through each pair of registering apertures 47 and 50 and nuts 52, threadable on the studs 51, are employed to firmly secure the connector members 49 to the tabs 46.

Although not illustrated, it is to be understood that a tire contacting member made of semihard rubber or like material could be rigidly secured, as by vulcanizing, cementing or by any other suitable means, to the outer arcuate surface of each arcuate segment 40. By making the tire contacting members of semihard rubber durability and long wear are assured, and at the same time they provide a cushioning effect when the tire 20 becomes deflated, as will be pointed out hereinafter.

When assembling the safety auxiliary rim 21 and mounting the tire 20 and the safety auxiliary rim 21 upon the wheel rim 11 the following steps are followed.

Before mounting the tubeless tire 20 on the wheel rim 11, the three arcuate segments 40 are assembled within the tire casing. This is easily accomplished by rigidly interconnecting the end portions 45 of the arcuate segments 40 by means of the connector members 49, the studs 51 and the nuts 52, as pointed out hereinbefore. The nuts 52 may be readily tightened with a conventional wrench, not shown.

Prior to the mounting of the tubeless, pneumatic tire 20, with the safety auxiliary rim 21 assembled therein, on the wheel rim 11, the semicircular mounting members 23 are rigidly fastened to the depressed center portion 14 of the wheel rim 11 by means of the clamp and bridge elements 29, 28, respectively, and the bolt 35 and nut 39, as described hereinbefore in detail. Once the arcuate segments 40 are assembled together within the casing of the tire 20 and the mounting members 23 are rigidly secured to the depressed center portion 14 of the wheel rim 11, the tire 20 together with the safety auxiliary rim 21 assembled therein is then moved transversely or axially of the vehicle wheel 10 from the normally inner or brake drum side of the wheel until one tire bead 19 is moved over the rim side flange 12 and is disposed between the rim side flange 12 and the mounting members 23 and the other tire bead 19 is out of engagement with the rim 11. An arcuate portion of the tire bead 19 disposed on the rim 11 is then moved until it abuts the mounting members 23 at the depressed center portion 14. The arcuate portion of the tire bead diametrically opposite the arcuate portion abutting or resting on the mounting members 23 can then be readily moved over the terminal free ends of the brackets 22. This is permitted since the radial length of each bracket 22 projecting radially outwardly from a circle containing the outer marginal edges of the rim side flange 12, 15 is less or equal to the radial spacing between the mounting members 23 and the circle containing the outer marginal edges of the rim side flanges 12, 13. Once a portion of the tire bead is disposed between a radial plane containing the brackets 22 and the rim side flange 13 such portion is moved radially inwardly until it engages the mounting members 23 to permit the arcuate tire bead portion 19 still disposed between the brackets 22 and the rim side flange 12 to be moved over the brackets 22 so as to also be disposed between the brackets 22 and the rim side flange 13. Thereafter, an arcuate section of the tire bead 19 is again caused to rest upon the depressed annular center portion 14 and because of the relationship of the radii of the depressed annular portion 14 and the outer marginal edges of the rim side flanges 12, 13 with respect to the disposition of the free end portions of the brackets 22 sufficient clearance is provided for the shank portion of a conventional tire wrench (not shown) to be inserted between the tire bead 19 and the rim side flange 12. The assembled safety auxiliary rim 21 is moved relatively to the rim 11 until the apertures 43 are in registration with the apertures 24 of a respective mounting member bracket 22. A pair of bolt and nut assemblies 44 are then employed for rigidly connecting the member 41 to the bracket 22. The tire 20 is then shifted so another arcuate section of the tire bead 19 is adjacent to the depressed center portion 14 to permit another member 41 and bracket 22 to be rigidly secured together. Shifting of the tire 20 with respect to the wheel to gain access to the interior of the tire 20 to fasten the members 41 to the brackets 22 is continued until all the members 41 are attached to the brackets 22 and the safety auxiliary rim 21 is rigidly connected to the wheel rim 11. The head of the bolt and nut of the assemblies 44 have hexagonal shapes and thus may be readily tightened by means of a conventional tire wrench. Thereafter, the beads 19 of the tire 20 are mounted on the respective perches 17 and 18 in the usual manner. It will be appreciated that the tire is now mounted on the wheel rim 11. A conventional air inlet valve (not shown) is carried by the rim 11 for inflating the tire 20. The tire 20 is then inflated to a pressure corresponding to its fully inflated condition and is firmly held on the wheel rim 11 in a conventional manner.

When the vehicle wheel and tire assembly described above is operated under normal road conditions and the tire is properly inflated, the inner surface of the tire tread is maintained in a radially spaced relationship with the outer peripheral surface provided by the assembled arcuate segments 40 of the safety auxiliary rim 21 (or the rubber tire contacting members if such members are provided on the segments 40), as shown in FIG. 2. However, should the tire 20 become deflated due to a puncture, blowout or for any other reason, the inner surface of the tire tread will be depressed so as to engage the outer peripheral surface of the assembled arcuate segments 40 or the annular cushion formed by the tire contacting members. A proportionate part of the weight of the vehicle will then be transmitted through the wheel rim 11, mounting members 23, brackets 22, members 41 and the assembled arcuate segments 40 to the tire tread. Inasmuch as the outer surfaces of the segments 40 when assembled together form a continuous outer peripheral surface spaced approximately three-fourths to 1¼ inches from the tire tread when the tire 20 is properly inflated, the vehicle wheel would only drop three-fourths to 1¼ inches upon the occurrence of a blowout. Consequently, the sidewalls of the tire 20 are not abnormally flexed or buckled and caused to be disengaged from the wheel rim 11 which generally results in the vehicle swerving out of control. The safety auxiliary rim 21 will efficiently and effectively support the tire 20 preventing the same from dropping to the rim 11 and at the same time allowing the vehicle operator to maintain proper control over the steering of the vehicle.

From the foregoing, it will be appreciated that the tire 20 used in conjunction with the novel wheel assembly described above will never run flat and be ruined as is generally the case in the event a blowout or puncture occurs of a tire mounted on a conventional wheel assembly. Furthermore, since the wheel assembly acts to protect the tire inasmuch as the sidewalls of the tire are not subjected to abnormal flexures which tend to weaken the tire casing, the vehicle may be safely driven until a time when it is convenient to repair the tire without seriously hampering the continued operation of the vehicle or damaging the deflated tire.

The embodiment of the invention chosen for the purposes of illustration and description herein is that preferred as the result of selective tests based upon the requirements for achieving the objects of the invention and developing the utility thereof in the most desirable manner, due regard being had to existing factors of economy, simplicity of design and construction, production methods and the improvements sought to be effected. It will be appreciated, therefore, that the particular structural and functional aspects emphasized herein are not intended to exclude, but rather to suggest, such other adaptations and modification of the invention as fall within the spirit and scope of the invention as defined in the appended claims.

I claim:

1. A tire and wheel assembly comprising a pneumatic tubeless tire including a casing having a tread and sidewalls terminating in spaced rim engaging beads; a drop-center type wheel rim having axially spaced side flanges for engaging said tire beads and a central depressed annular portion; a safety auxiliary rim disposed within said tire casing having an outer peripheral surface of a diameter less than the inner diameter of said tire tread when said tire is inflated to its normal operating pressure, said auxiliary rim including a plurality of arcuate segments arranged end to end and each end of each arcuate segment being provided with a radially inwardly extending tab having an aperture formed therethrough, and means for detachably connecting adjacent ends of said segments together including a plurality of generally rectangular, platelike members, each of said connector members having a pair of spaced apertures formed therethrough and being positionable on a pair of adjacent tabs so as to cause said connector member apertures to register with the apertures of said respective pair of adjacent tabs, and bolt and nut assemblies cooperable with said registering apertures for detachably securing said connecting members to said segment tabs; a plurality of circumferentially spaced, flat platelike members fixed to said auxiliary rim, said members extending radially inwardly; and means for rigidly securing the free end of each of said flat platelike members to said central annular portion including a plurality of circumferentially spaced platelike brackets disposed substantially in a radial plane perpendicular to the rotational axis of the tire and wheel assembly, said brackets extending radially outwardly with respect to said central depressed annular portion, each of said brackets having a radially extending free end portion disposed radially outwardly from the outer marginal edges of said side flanges and adjacent the free end portion of a respective flat platelike member, means for detachably connecting the free end portion of each of said brackets to the free end portion of a respective flat platelike member, to maintain said auxiliary rim radially spaced from said wheel rim including a plurality of circumferentially spaced bolt and nut assemblies, the longitudinal axes of said bolts extending axially and said bolt and nut assemblies being disposed radially outwardly of the radially outermost marginal edges of said side flanges when the free end portions of said flat platelike members and the free end portions of said brackets are connected together, and means for detachably rigidly connecting the radially innermost end of each of said brackets to said central depressed annular portions includes bracket mounting means having the radially innermost ends of said brackets rigidly secured thereto, said bracket mounting means being positionable to encircle said central depressed annular portion and having surface portions frictionally engageable with said central depressed annular portion, said bracket means including a pair of semicircular bracket mounting members each having an axial width substantially equal to the axial width of said central depressed annular portion, the terminal end of each bracket mounting member being circumferentially spaced from a respective terminal end of the other bracket mounting member when said bracket mounting surface portions are in frictional engagement with said central depressed annular portion, and manually operable means for forcing said bracket mounting means surface portions into frictional engagement with said central depressed annular portion including clamping means for drawing a pair of adjacent terminal ends of said bracket members circumferentially toward each other to force said bracket mounting member surface portions into frictional engagement with said central depressed annular portion.

2. A tire and wheel assembly as set forth in claim 1, wherein said means for detachably connecting the radially innermost end of each of said brackets to said central depressed annular portion includes a detachable bridge element for operatively interconnecting the adjacent terminal ends of said bracket mounting members opposite said clamping means said bridge element being effective to limit the circumferential separation permitted between said adjacent terminal ends of said bracket mounting members, and said clamping means includes a pair of clamp elements, each of said clamp elements being formed with a notch partially defined by a flat surface, each of said notch flat surfaces being positionable to abut a respective flat surface provided on the terminal portions of the bracket mounting members opposite said bridge element, said clamp elements being separable from said bracket mount members and each clamp element being provided with a bore therethrough, said clamping means further including a nut and bolt assembly, the shank of said bolt being insertable through said clamp element bores.